(12) United States Patent
Terada et al.

(10) Patent No.: US 9,160,011 B2
(45) Date of Patent: Oct. 13, 2015

(54) FUEL CELL SEPARATOR SEALING MATERIAL AND FUEL CELL SEPARATOR

(75) Inventors: Satoru Terada, Wako (JP); Daisuke Okonogi, Wako (JP); Noriyuki Meguriya, Annaka (JP); Osamu Hayashida, Annaka (JP)

(73) Assignees: HONDA MOTOR CO., LTD., Tokyo (JP); Shin-Etsu Chemical Co., Ltd., Tokyo (JP)

( * ) Notice: Subject to any disclaimer, the term of this patent is extended or adjusted under 35 U.S.C. 154(b) by 1705 days.

(21) Appl. No.: 12/395,157

(22) Filed: Feb. 27, 2009

(65) Prior Publication Data

US 2009/0220849 A1   Sep. 3, 2009

(30) Foreign Application Priority Data

Feb. 28, 2008 (JP) ................................. 2008-047601

(51) Int. Cl.
*H01M 2/08* (2006.01)
*C08L 83/00* (2006.01)
*H01M 8/02* (2006.01)

(52) U.S. Cl.
CPC .......... *H01M 8/0284* (2013.01); *H01M 8/0286* (2013.01); *Y02E 60/50* (2013.01)

(58) Field of Classification Search
USPC ........................................................ 524/588
See application file for complete search history.

(56) References Cited

U.S. PATENT DOCUMENTS

| 6,153,326 A | 11/2000 | Matsukawa et al. |
| 2002/0187385 A1 | 12/2002 | Meguriya et al. |
| 2004/0097640 A1* | 5/2004 | Meguriya et al. ............. 524/588 |

FOREIGN PATENT DOCUMENTS

| JP | 11-129396 A | 5/1999 |
| JP | 11-309747 A | 11/1999 |
| JP | 2002-309092 A | 10/2002 |
| JP | 2004-14150 A | 1/2004 |
| JP | 2004-103290 A | 4/2004 |
| JP | 2007-146147 A | 6/2007 |
| JP | 2007146147 A * | 6/2007 |

* cited by examiner

*Primary Examiner* — Ula C Ruddock
*Assistant Examiner* — Daniel Gatewood
(74) *Attorney, Agent, or Firm* — Birch, Stewart, Kolasch & Birch, LLP

(57) ABSTRACT

For use in a fuel cell separator comprising a separator substrate, a primer layer, and an elastomeric seal, a sealing material comprises a primer composition containing Si—H groups of which the primer layer is formed, and a liquid addition-curable silicone rubber composition containing alkenyl groups and Si—H groups of which the elastomeric seal is formed. A molar ratio of the total amount of Si—H groups to the total amount of alkenyl groups per unit weight of the primer composition and the silicone rubber composition is in the range: 5.0<Si—H/alkenyl<50.0.

5 Claims, 7 Drawing Sheets

FUEL CELL SEPARATOR SEALING MATERIAL AND FUEL CELL SEPARATOR

CROSS-REFERENCE TO RELATED APPLICATION

This non-provisional application claims priority under 35 U.S.C. §119(a) on Patent Application No. 2008-047601 filed in Japan on Feb. 28, 2008, the entire contents of which are hereby incorporated by reference.

TECHNICAL FIELD

This invention relates to sealing materials for use in separators of polymer electrolyte fuel cells (PEFC) featuring compactness and more particularly, to sealing materials for use in separators of PEFC which have a long service life and ease of molding, and fuel cell separators formed using the same.

BACKGROUND ART

The fuel cell is capable of producing electricity without a substantial need for fossil fuel that poses concerns about resource depletion, without noise, and at a high energy recovery rate as compared with other energy-based power generating systems. Great efforts have been made to exploit the fuel cell as a power generating plant of relatively compact size in buildings and factories, with some cells having been commercially implemented. In particular, polymer electrolyte fuel cells (PEFC) can operate at lower temperature than fuel cells of other types. The PEFC then draws attention not only as a device for household co-generation, but also as the replacement power source for internal combustion engines on vehicles because of the minimized corrosion concern regarding the materials of which cell components are made and their ability to discharge relatively high current flow despite low temperature operation. The PEFC is constructed of electrolyte membranes, separators and other components. The separator is generally a plate which is provided with a plurality of juxtaposed channels on one surface or both surfaces. The separator plays the role of conducting the electricity produced at the gas diffusion electrode within the fuel cell to the exterior, discharging water produced within the channels in the course of electricity generation, and securing the channels as a flow path for incoming reaction gas to the fuel cell. Such a fuel cell separator is required to be more compact in size. Since a multiplicity of separators are used in stack, there is a demand for a separator seal material having durability and long term service.

As the separator sealing material, packing materials based on various resins have been under study. Among them, sealing materials based on silicone rubber are often used for their moldability, heat resistance and elasticity. JP-A 11-129396 and JP-A 11-309747 disclose silicone rubber compositions of the addition cure type which are more effectively moldable to form seals. However, silicone rubbers obtained by curing these compositions are still unsatisfactory in maintaining elasticity over a long term.

In particular, packing materials for fuel cell separators are difficult to meet both the requirements of acid resistance and seal performance (or compression set) in acidic aqueous solution. JP-A 2002-309092 discloses the use of silicone resins as a solution to this problem. For seals on PEFC separators, however, not only acid resistance and low compression set, but adhesion to separator substrates is also an important factor. JP-A 2004-014150 discloses as a carbon separator gasket material a silicone rubber having minimized compression set in long-life coolant (LLC), but refers nowhere to the adherence of this silicone rubber. A primer suitable for use in fuel cell separators is disclosed in JP-A 2007-146147 where the rubber material is described merely as belonging to the addition cure type, but no further detail is described. Similarly, a primer suited for bonding a sealing material to a carbon separator substrate is disclosed in JP-A 2004-103290 where the rubber material is described as comprising preferably addition cure type liquid silicone, with no further detail.

CITATION LIST

Patent Document 1: JP-A H11-129396
Patent Document 2: JP-A H11-309747
Patent Document 3: JP-A 2002-309092
Patent Document 4: JP-A 2004-014150
Patent Document 5: JP-A 2007-146147
Patent Document 6: JP-A 2004-103290

SUMMARY OF THE INVENTION

An object of the invention is to provide a separator with improved seal performance for use in polymer electrolyte fuel cells, and more specifically, a sealing material for use in a fuel cell separator having a three layer structure of a separator substrate, a primer layer, and an elastomeric seal layer on at least one side thereof, wherein the bond between the substrate and the elastomeric layer is good enough to maintain a long-term seal performance even in an acidic solution. Another object is to provide a fuel cell separator comprising the sealing material.

The invention pertains to a fuel cell separator having an elastomeric seal on at least one surface of a separator substrate, and specifically having a three layer structure of a separator substrate, a primer layer on a surface thereof, and an elastomeric seal disposed outside the primer layer. The primer layer is a cured product of a primer composition containing Si—H functional groups (i.e., hydrogen atoms each attached directly to a silicon atom), and the elastomeric seal is a cured product of a liquid addition-curable silicone rubber composition containing alkenyl groups and Si—H functional groups. The above and other objects are attained when the primer composition and the silicone rubber composition are combined such that a molar ratio of the total amount of Si—H functional groups to the total amount of alkenyl groups, which are available per unit weight from the primer composition and the silicone rubber composition, is in the range: 5.0<(total amount of Si—H functional groups)/(total amount of alkenyl groups)<50.0.

The present invention provides a fuel cell separator sealing material and a fuel cell separator, as defined below.

[1] A sealing material for use in a fuel cell separator comprising a separator substrate, a primer layer thereon, and an elastomeric seal on the primer layer, said sealing material comprising a primer composition containing Si—H functional groups of which the primer layer is formed, and a liquid addition-curable silicone rubber composition containing alkenyl groups and Si—H functional groups of which the elastomeric seal is formed, wherein a molar ratio of the total amount of Si—H functional groups to the total amount of alkenyl groups per unit weight of the primer composition and the silicone rubber composition is in the range: 5.0<(total amount of Si—H functional groups)/(total amount of alkenyl groups)<50.0.

[2] The sealing material of [1] wherein said liquid addition-curable silicone rubber composition comprises (A) 100 parts by weight of a liquid organopolysiloxane containing at least two alkenyl groups each attached to a silicon atom in a molecule, (B) 0.5 to 20 parts by weight of an organohydrogenpolysiloxane containing at least three Si—H functional groups in a molecule, (C) 5 to 30 parts by weight of fumed silica having a specific surface area of 50 to 400 m²/g, and (D) a catalytic amount of an addition reaction catalyst, a molar ratio of Si—H functional groups in component (B) to alkenyl groups in component (A) being in the range: 0.8≤Si—H functional groups/alkenyl groups≤3.0.

[3] The sealing material of [1] or [2] wherein said primer composition comprises (E) an organosilicon compound containing at least one epoxy group, at least one Si—H functional group, and at least one aromatic ring in a molecule, (F) a silicone resin, and (G) a compound containing at least two alkenyl groups in a molecule.

[4] A combination of the silicone rubber composition with the primer composition set forth in any one of [1] to [3] for use in fuel cell separators wherein the amount of Si—H functional groups in the primer composition is in the range of 0.1 to 10.0 mmol per gram of the active components exclusive of solvent given as the nonvolatile content after heating at 105° C. for 3 hours.

[5] A fuel cell separator comprising a separator substrate, a primer layer on a surface of the substrate and an elastomeric seal disposed on the primer layer, wherein said primer layer is a cured product of the primer composition of [3] and said elastomeric seal is a cured product of the silicone rubber composition of [2].

Advantageous Effects of Invention

When the sealing material is used in a fuel cell separator, it establishes a tight bond between the separator substrate and the elastomeric seal and maintains a good seal performance and tight bond even in an acidic solution over a long term.

BRIEF DESCRIPTION OF DRAWINGS

In the following description, like reference characters designate like or corresponding parts throughout the several views shown in the figures.

DESCRIPTION OF EMBODIMENTS

Figure 1:
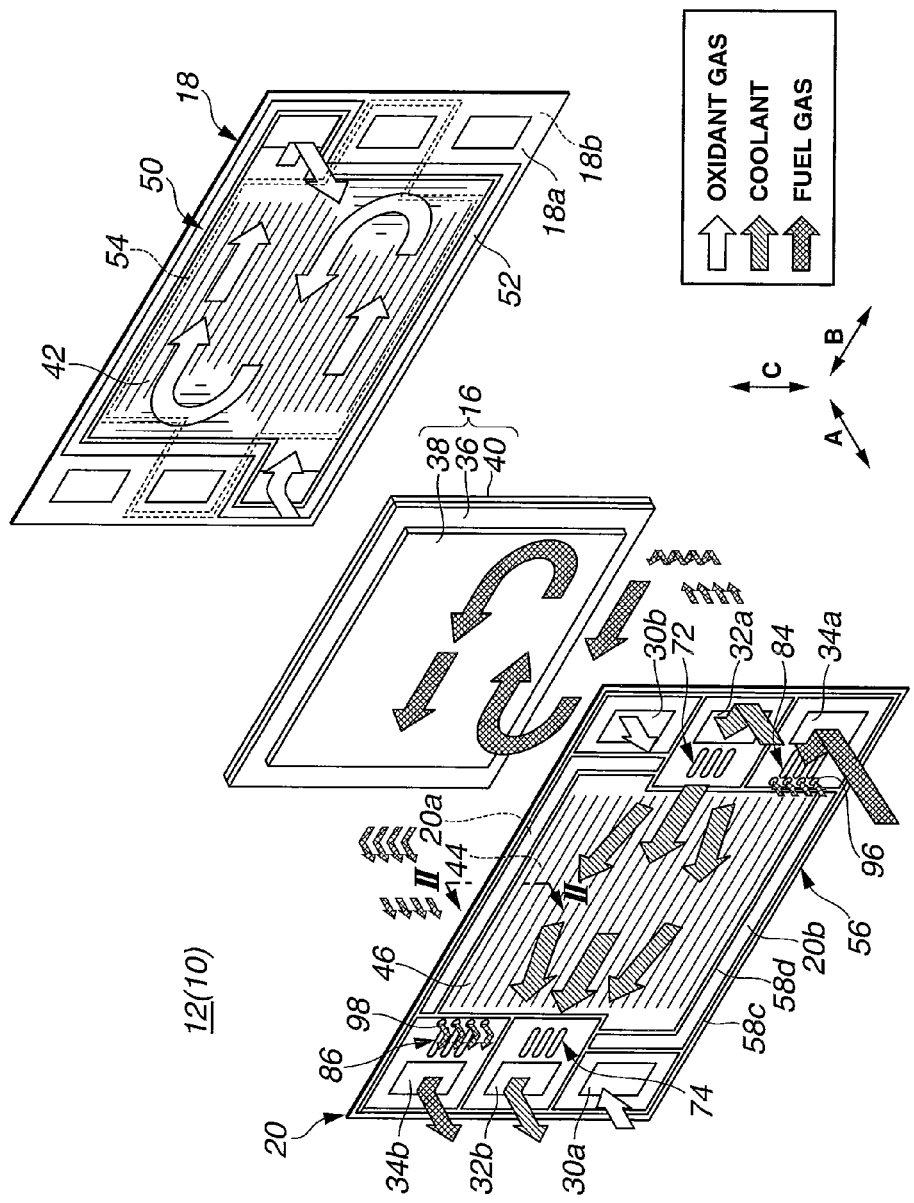
FIG. 1 is a perspective exploded view showing main components of a power-generating cell in a fuel cell stack according to one embodiment of the invention.

As used herein, the singular forms "a," "an" and "the" do not denote a limitation of quantity, but rather denote the presence of at least one of the referenced item. The terms "first," "second" and the like do not denote any order or importance, but rather are used to distinguish one element from another. It is also understood that terms such as "top," "bottom," "outward," "inward" and the like are words of convenience and are not to be construed as limiting terms.

Silicone Rubber Composition

Briefly stated, the invention is directed to a combination of a primer composition with a liquid addition-curable silicone rubber composition. The liquid addition-curable silicone rubber composition used herein is not particularly limited as long as it meets the specified molar ratio of Si—H functional group content to alkenyl group content in both the silicone rubber composition and the primer composition. Preferred is a liquid addition-curable silicone rubber composition comprising as essential components, (A) 100 parts by weight of a organopolysiloxane containing at least two alkenyl groups each attached to a silicon atom in a molecule, (B) 0.5 to 20 parts by weight of an organohydrogenpolysiloxane containing at least three hydrogen atoms each attached to a silicon atom (i.e., Si—H functional groups) in a molecule, (C) 5 to 30 parts by weight of fumed silica having a specific surface area of 50 to 400 m²/g, and (D) a catalytic amount of an addition reaction catalyst.

Component (A) is an organopolysiloxane containing at least two alkenyl groups each attached to a silicon atom in a molecule. Most often, it is represented by the following average compositional formula (I):

$$R^1_a SiO_{(4-a)/2} \quad (I)$$

wherein $R^1$ which may be the same or different is a substituted or unsubstituted monovalent hydrocarbon group having 1 to 10 carbon atoms, preferably 1 to 8 carbon atoms, and "a" is a positive number in the range of 1.5 to 2.8, preferably 1.8 to 2.5, and more preferably 1.95 to 2.05.

Examples of the substituted or unsubstituted monovalent hydrocarbon group represented by $R^1$ include alkyl groups such as methyl, ethyl, propyl, isopropyl, butyl, isobutyl, tert-butyl, pentyl, neopentyl, hexyl, cyclohexyl, octyl, nonyl, and decyl; aryl groups such as phenyl, tolyl, xylyl and naphthyl; aralkyl groups such as benzyl, phenylethyl and phenylpropyl; alkenyl groups such as vinyl, allyl, propenyl, isopropenyl, butenyl, hexenyl, cyclohexenyl and octenyl, as well as substituted forms of the foregoing groups in which some or all hydrogen atoms are replaced by halogen atoms (e.g., fluoro, bromo and chloro), cyano groups or the like, such as chloromethyl, chloropropyl, bromoethyl, trifluoropropyl and cyanoethyl. Preferably, at least 90 mol % of the entire $R^1$ are methyl.

At least two of $R^1$ should be alkenyl groups, preferably of 2 to 8 carbon atoms, more preferably 2 to 6 carbon atoms, and most preferably vinyl. The content of alkenyl groups is preferably $5.0 \times 10^{-6}$ mol/g to $5.0 \times 10^{-3}$ mol/g, more preferably $1.0 \times 10^{-5}$ mol/g to $1.0 \times 10^{-3}$ mol/g of the organopolysiloxane. An alkenyl content of less than $5.0 \times 10^{-6}$ mol/g may give too low a rubber hardness to provide a satisfactory seal whereas an alkenyl content of more than $5.0 \times 10^{-3}$ mol/g may result in a higher crosslinked density and hence, brittle rubber.

The alkenyl groups may be attached to a silicon atom at the end of the molecular chain or a silicon atom midway the molecular chain or both. The inclusion of at least alkenyl groups attached to silicon atoms at both ends of the molecular chain is preferred.

The preferred organopolysiloxane basically has a linear structure, but may have a branched, cyclic or three-dimensional network structure. With respect to the molecular weight, the organopolysiloxane is not particularly limited and may include a wide spectrum ranging from liquid one having a low viscosity to gum-like one having a high viscosity at room temperature (25° C.). The preferred organopolysiloxane has a weight average degree of polymerization of 100 to 2,000, and more preferably 150 to 1,500. If the weight average degree of polymerization is less than 100, a cured silicone rubber may have an insufficient elasticity to provide a seal. If the weight average degree of polymerization is more than 2,000, a silicone rubber composition may become too viscous to mold. When the organopolysiloxane has a three-dimensional network structure, it is preferred that a weight average molecular weight of the three-dimensional network organopolysiloxane is about 100,000 (usually about 3,000 to about 100,000), especially about 5,000 to about 50,000. The weight average degree of polymerization and the weight average molecular weight are determined by gel permeation chromatography (GPC) versus polystyrene standards.

Component (B) is an organohydrogenpolysiloxane containing at least three hydrogen atoms each attached to a silicon atom (i.e., Si—H groups) in a molecule. It serves as a crosslinking agent for curing the composition wherein Si—H groups in the molecule crosslink with silicon-bonded alkenyl groups in component (A) through hydrosilylating addition reaction.

Most often, the organohydrogenpolysiloxane (B) is represented by the following average compositional formula (II):

$$R^2{}_b H_c SiO_{(4-b-c)/2} \tag{II}$$

wherein $R^2$ is each independently a substituted or unsubstituted monovalent hydrocarbon group having 1 to 10 carbon atoms, preferably 1 to 8 carbon atoms, "b" is a positive number of 0.7 to 2.1, "c" is a positive number of 0.001 to 1.0, and b+c is from 0.8 to 3.0. Preferred are those of formula (II) having at least three (typically 3 to 300), more preferably 3 to 100, most preferably 3 to 50 silicon-bonded hydrogen atoms in a molecule.

Examples of the monovalent hydrocarbon group represented by $R^2$ are as exemplified above for $R^1$ although groups free of aliphatic unsaturation (as in alkenyl groups) are preferred. Preferably, "b" is 0.8 to 2.0, "c" is 0.01 to 1.0, and b+c is from 1.0 to 2.5.

The molecular structure of the organohydrogenpolysiloxane may be straight, cyclic, branched or three-dimensional network. The number of silicon atoms per molecule or the degree of polymerization is preferably about 2 to about 300, especially about 4 to about 150. Differently stated, the preferred organohydrogenpolysiloxanes are those which are liquid at room temperature (25° C.) and specifically have a viscosity of up to 1,000 mPa·s, and more preferably 0.1 to 500 mPa·s at 25° C. The hydrogen atoms may be attached to a silicon atom at the end of the molecular chain or a silicon atom midway the molecular chain or both.

Exemplary of the organohydrogenpolysiloxane (B) are trimethylsiloxy-terminated methylhydrogenpolysiloxane, trimethylsiloxy-terminated dimethylsiloxanemethylhydrogensiloxane copolymers, dimethylhydrogensiloxy-terminated dimethylpolysiloxane, dimethylhydrogensiloxy-terminated dimethylsiloxanemethylhydrogensiloxane copolymers, trimethylsiloxy-terminated methylhydrogensiloxane-diphenylsiloxane copolymers, trimethylsiloxy-terminated methylhydrogensiloxane-diphenylsiloxane-dimethylsiloxane copolymers, copolymers composed of $(CH_3)_2HSiO_{1/2}$ units and $SiO_{4/2}$ units, and copolymers composed of $(CH_3)_2HSiO_{1/2}$ units, $SiO_{4/2}$ units and $(C_6H_5)SiO_{3/2}$ units. As used herein, the term "terminated" means that the polysiloxane is capped at both ends of its molecular chain with the indicated groups.

The amount of the organohydrogenpolysiloxane (B) blended is 0.5 to 20 parts, and preferably 0.6 to 15 parts by weight, per 100 parts by weight of component (A). The molar ratio of silicon-bonded hydrogen atoms (Si—H groups) in component (B) to alkenyl groups in component (A), [Si—H/alkenyl], is preferably from 0.8:1 to 3.0:1, especially from 1.0:1 to 1.5:1. A molar ratio outside this range may lead to cured rubber with increased compression set, aggravating the seal performance.

Component (C) is fumed silica which is essential to impart satisfactory strength to silicone rubber. The fumed silica should have a specific surface area of 50 to 400 m²/g, and preferably 100 to 350 m²/g, as measured by the BET method. A surface area below 50 m²/g may compromise acid resistance whereas above 400 m²/g, compression set increases. The fumed silica may be used as such, but preferably after treatment with a surface hydrophobizing agent. Alternatively, a surface treating agent is added when the fumed silica is mixed with the silicone fluid, whereby the fumed silica is treated during the mixing step. Suitable surface treating agents are well-known agents including alkylalkoxysilanes, alkylchlorosilanes, alkylsilazanes, silane coupling agents, titanate treating agents, and fatty acid esters alone or in admixture. When two or more agents are used, they may be applied at the same time or different times.

The amount of fumed silica (C) blended is 5 to 30 parts, preferably 10 to 30 parts, especially 12 to 28 parts by weight, per 100 parts by weight of component (A). Less than 10 parts of fumed silica fails to provide satisfactory rubber strength whereas more than 30 parts increases compression set, aggravating the seal performance.

Component (D) is an addition reaction catalyst for promoting addition reaction between alkenyl groups in the organopolysiloxanes as component (A) and silicon-bonded hydrogen atoms (Si—H groups) in the organohydrogenpolysiloxane as component (B). Most often, the catalyst is selected from platinum group metal-based catalysts including platinum catalysts such as platinum black, platinic chloride, chloroplatinic acid, reaction products of chloroplatinic acid with monohydric alcohols, complexes of chloroplatinic acid with olefins, and platinum bisacetoacetate as well as palladium catalysts and rhodium catalysts, with the platinum catalysts being preferred.

The amount of the catalyst blended is a catalytic amount to promote addition reaction and usually about 0.5 to 1,000 ppm, especially about 1 to 500 ppm of platinum group metal based on the weight of component (A). Less than 0.5 ppm may be ineffective to promote addition reaction, leading to undercure. Amounts of more than 1,000 ppm may exert little further effect on reactivity and be uneconomical.

If necessary, the composition may further contain other components, for example, reinforcing agents such as precipitated silica and silicone resins; fillers such as ground quartz, diatomaceous earth and calcium carbonate; hydrosilylation reaction regulating agents such as nitrogen-containing compounds, acetylene compounds, phosphorus compounds, nitrile compounds, carboxylates, tin compounds, mercury compounds, and sulfur compounds; heat resistance improvers such as iron oxide and cerium oxide; internal parting agents such as dimethylsilicone fluid; tackifiers, and thixotropic agents.

The separator seal is formed of the addition reaction cure type silicone rubber composition comprising the above-described components in the cured state. The silicone rubber composition may be applied and cured by well-known techniques, forming a seal on a PEFC separator.

Primer Composition

The primer composition used herein is not particularly limited as long as it comprises one or more compound, typically organosilicon compound, having a Si—H functional group (i.e., hydrogen atom attached directly to a silicon atom) and meets the specified molar ratio of Si—H functional group content to alkenyl group content in both the silicone rubber composition and the primer composition. In a preferred embodiment, the amount of Si—H functional groups in the primer composition is in the range of 0.1 to 10.0 mmol per gram of the active components exclusive of solvent, and more preferably 0.5 to 5.0 mmol/g. If the amount of Si—H functional groups is less than 0.1 mmol/g, the adhesion between the separator substrate and the seal may be weak. If the amount of Si—H functional groups is more than 10.0 mmol/g, the organosilicon compound may be too reactive to handle. As used herein, the "active components exclusive of solvent" of the primer composition are given as the nonvolatile content after heating the primer composition at 105° C. for 3 hours. Specifically, the nonvolatile content is determined by weighing a 1.5-2.0 g sample from the primer composition, placing it in a commercial aluminum dish, statically holding it in an oven at 105° C. for 3 hours, and measuring a weight change before and after heating.

The compound, typically organosilicon compound, having a Si—H functional group is selected from the same organohydrogenpolysiloxanes of average compositional formula (II) serving as component (B) or crosslinker in the silicone rubber composition as well as compounds of the following formula (III).

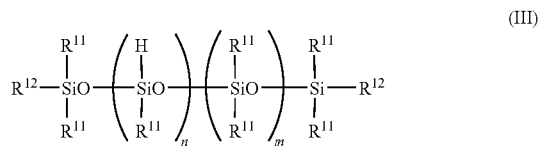

Herein, $R^{11}$ is $C_1$-$C_6$ alkyl, $R^{12}$ is hydrogen or $C_1$-$C_6$ alkyl, m+n is an integer of at least 4, specifically 4 to 100, and n is an integer of at least 1.

Those compounds illustrated below are also useful, for example, organosilicon compounds having at least one, preferably 1 to 50, and more preferably 2 to 20 Si—H groups (i.e., hydrogen atoms each attached directly to a silicon atom) and one or more groups selected from among epoxy groups, trialkoxysilyl groups, and aromatic rings of phenyl skeleton (i.e., di- to tetravalent phenylene) or the like, and specifically organosilanes and linear or cyclic organopolysiloxanes having 1 to about 200 silicon atoms, preferably 1 to about 100 silicon atoms, and more preferably 1 to about 50 silicon atoms.

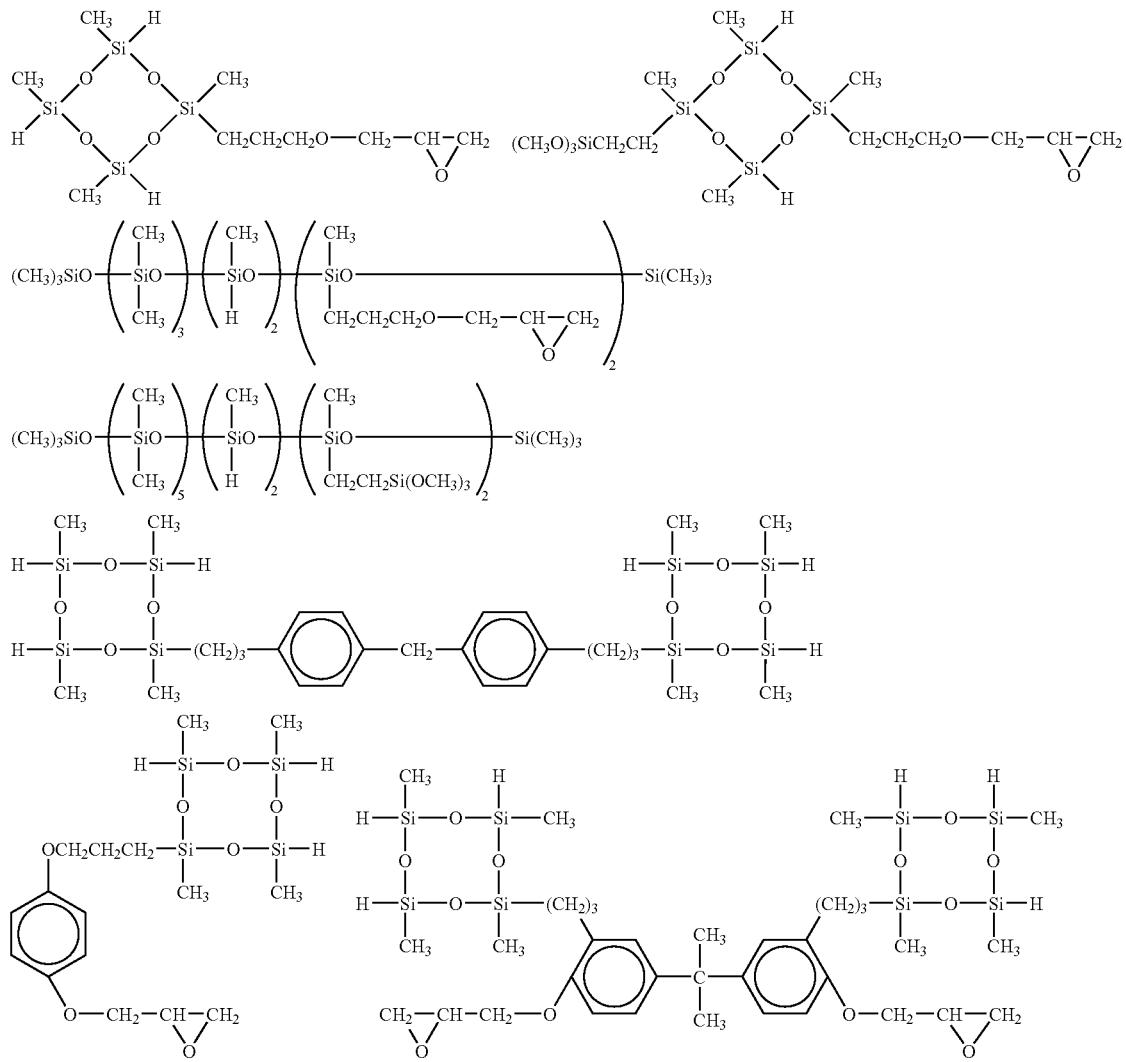

Preferred is a primer composition comprising (E) an organosilicon compound containing at least one epoxy group, at least one Si—H group, and at least one aromatic ring in a molecule, (F) a silicone resin, and (G) a compound containing at least two alkenyl groups in a molecule.

Component (E) is an organosilicon compound having at least one Si—H group (i.e., hydrogen atom attached directly to a silicon atom). It is preferably selected from organosilanes and linear or cyclic organopolysiloxanes of 1 to 200 silicon atoms, preferably 1 to 100 silicon atoms, and more preferably 1 to 50 silicon atoms, having at least one Si—H group, preferably 1 to about 50 Si—H groups, and more preferably 2 to about 20 Si—H groups.

Also useful as component (E) are organosilicon compounds having in a molecule at least one phenyl skeleton (i.e., di- to tetravalent phenylene) or phenyl group and at least one Si—H group, preferably 1 to about 10 Si—H groups, and more preferably 2 to about 6 Si—H groups.

Exemplary compounds which can be used as component (E) are given below.

wherein R' is a group selected from the following:

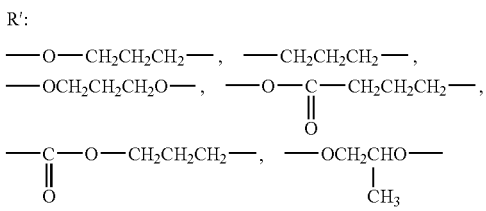

Rw and Rx each are a substituted or unsubstituted monovalent hydrocarbon group, q is equal to 1 to 50, h is equal to 0 to 100, and preferably q=1 to 20 and h=1 to 50. R" is a group selected from the following:

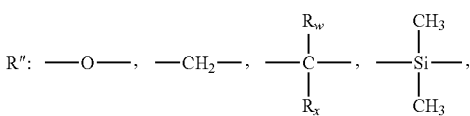

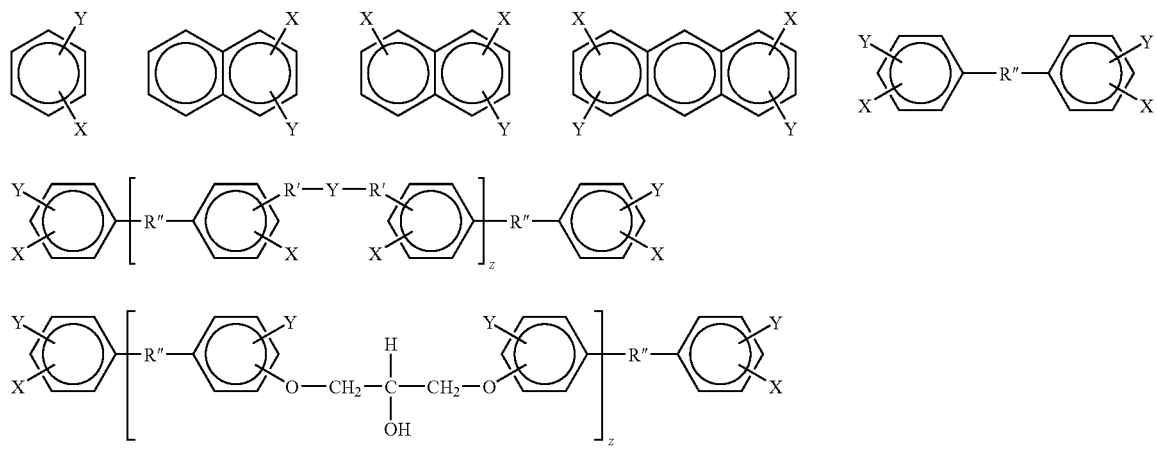

Herein, X is

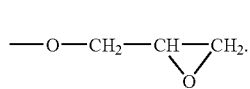

Y is a group:

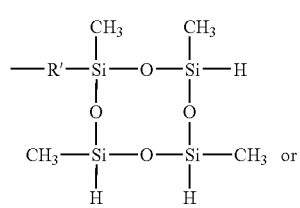

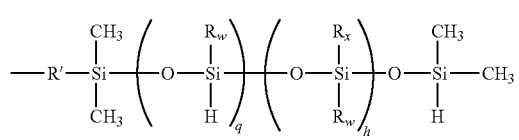

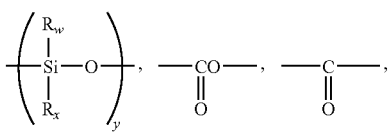

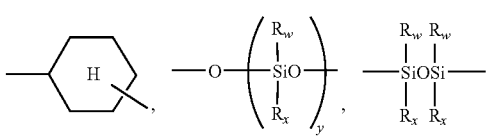

wherein Rw and Rx are as defined above, and y is equal to 0 to 100. Y' is a group:

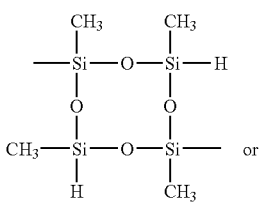

-continued

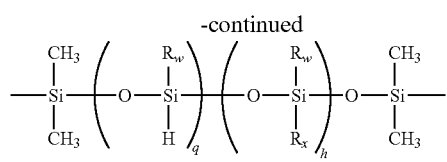

wherein Rw, Rx, q and h are as defined above. The subscript z is equal to 1 to 10.

The substituted or unsubstituted monovalent hydrocarbon groups represented by Rw and Rx are preferably those of 1 to 12 carbon atoms, especially 1 to 8 carbon atoms, including alkyl, aryl, aralkyl, and alkenyl groups, as exemplified for $R^1$. The substituted monovalent hydrocarbon groups include substituted forms of the foregoing unsubstituted monovalent hydrocarbon groups in which one or more hydrogen atoms are substituted by alkoxy, acrylic, methacrylic, acryloyl, methacryloyl, amino or alkylamino groups.

As the tackifying component (E), the foregoing compounds may be used alone or in admixture of two or more. A reaction product of any two or more may also be used.

Typical compounds are illustrated below.

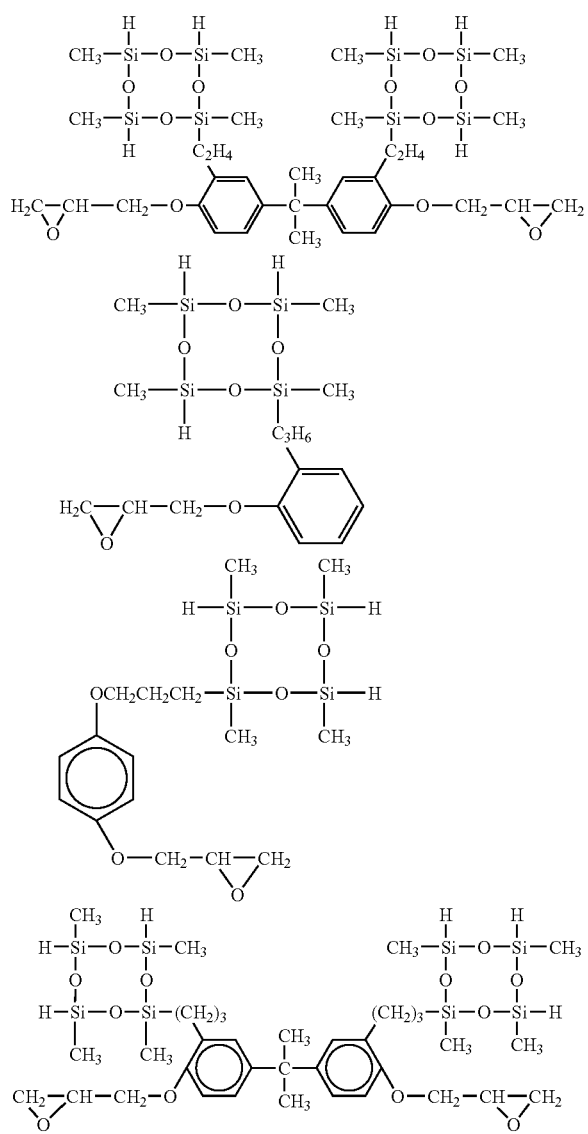

Component (F) is a film-forming component of a primer layer. It is a silicone resin, that is, an organopolysiloxane of three-dimensional network structure comprising trifunctional siloxane units and/or $SiO_{4/2}$ units in a molecule. Included are silicone resins terminated with methyl, Si—H, aliphatic unsaturated groups or the like, and silicone resins containing phenyl groups as well as methyl groups in a molecule. Those silicone resins containing phenyl groups are preferred for their high affinity to component (E). Phenyl-containing silicone resins may be produced, for example, by hydrolysis of a mixture of trichlorosilane, diphenyldichlorosilane and dichlorosilane.

Preferred are those silicone resins, preferably containing phenyl groups, represented by the average compositional formula (IV).

$$R_p(C_6H_5)_qSiO_{(4-p-q)/2} \quad (IV)$$

Herein R is hydrogen, $C_1$-$C_6$ alkyl (e.g., methyl, ethyl or propyl), or $C_2$-$C_4$ alkenyl (e.g., vinyl or allyl), p and q are numbers in the range: $0.8 \leq p+q < 2$, preferably $1 \leq p+q \leq 1.8$, more preferably $1 \leq p+q \leq 1.5$, and $0 \leq q/(p+q) \leq 0.9$, preferably $0.1 \leq q/(p+q) \leq 0.80$, more preferably $0.25 \leq q/(p+q) \leq 0.70$.

It is noted that the silicone resin has a total content of trifunctional siloxane units ($RSiO_{3/2}$ or $(C_6H_5)SiO_{3/2}$ units) and/or $SiO_{4/2}$ units which is desirably 25 to 100 mol %, and more desirably 30 to 70 mol % based on the entire siloxane units.

The silicone resin (F) is preferably used in an amount of 1 to 100 parts, more preferably 2 to 30 parts by weight per 10 parts by weight of component (E). Outside the range, a less amount of the silicone resin may fail to form an effective adhesive coating whereas a larger amount of the silicone resin may correspond to a lower concentration of the tackifying component, failing to achieve satisfactory adhesion.

Component (G) is a compound having at least two alkenyl groups in a molecule, which is selected from siloxane and aromatic hydrocarbon compounds having 2 to 8, preferably 2 to 4 alkenyl groups in a molecule, for example, cyclic oligomers of methylvinylsiloxane having the formula:

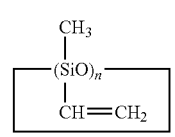

wherein n is an integer of 4 to 8; aromatic bis-ether compounds of the structure:

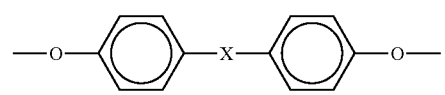

(wherein X is a single bond,

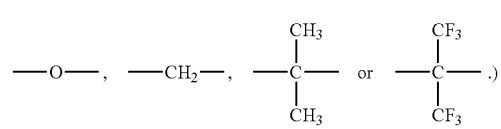

having an alkenyl-containing monovalent substituent group such as vinyl, allyl, or (meth)acryloxyethyl at either end of the molecule, and free of silicon atoms; and di- to tetravalent aromatic carboxylic esters of the structure:

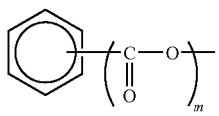

(wherein m is an integer of 2 to 4) having a monovalent substituent group such as vinyl, allyl, or (meth)acryloxyethyl at the end of the molecule. They assist in adhesion to the sealing material (silicone rubber). Exemplary alkenyl-containing compounds are illustrated below, but not limited thereto.

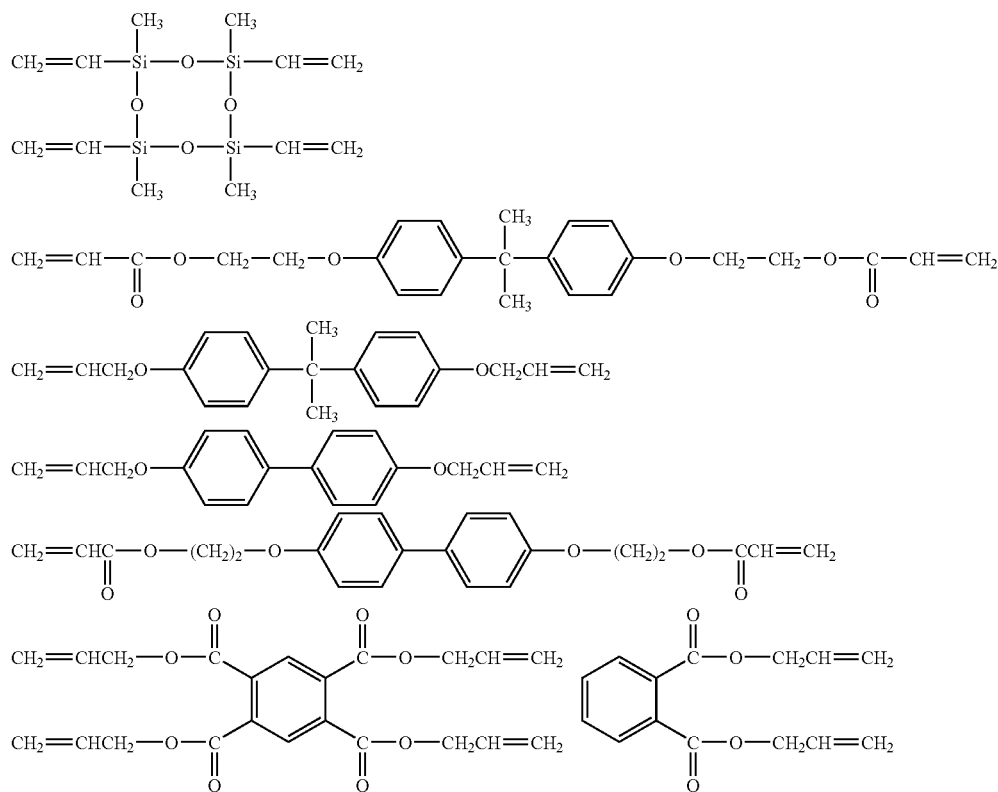

The alkenyl-containing compound (G) is preferably used in an amount of 0.01 to 5 parts, more preferably 0.1 to 1 parts by weight per 10 parts by weight of component (E).

To the primer composition, a solvent may be added if necessary. The type and amount of solvent may be adjusted in accordance with the working conditions of the primer composition and the like. The solvent used herein is selected from those solvents in which the primer composition is soluble, typically organic solvents such as xylene, toluene, benzene, heptane, hexane, trichloroethylene, perchloroethylene, methylene chloride, ethyl acetate, methyl isobutyl ketone, methyl ethyl ketone, ethanol, isopropanol, butanol, ligroin, cyclohexanone, diethyl ether, rubber solvent, and silicone solvents. From these solvents, a single solvent or a mixture of solvents may be selected and used depending on the rate of evaporation during the primer coating step. The solvent may be used in any amount as long as it does not interfere with the coating and drying steps. For example, an appropriate amount of the solvent is 1 to 1,000 parts, preferably 10 to 500 parts by weight per 10 parts by weight of component (E).

In the primer composition, one or more alkylalkoxysilanes, alkylsilazanes, silane coupling agents, and titanate compounds may be compounded.

Separator

The fuel cell separator may be manufactured by forming a primer layer on a separator substrate configured to define gas flow channels therein, applying and curing a liquid addition-curable silicone rubber composition thereto to form an elastomeric seal layer on the primer layer.

The separator substrate used herein may be a metal thin plate or a substrate manufactured by integral molding of an electrically conductive powder in a binder. Examples of the conductive powder include natural graphite such as flake graphite, artificial graphite, and conductive carbon blacks such as acetylene black and Ketjen Black. Any powders may be used as long as they are electrically conductive. Suitable binders include epoxy resins, phenolic resins, and rubber-modified phenolic resins.

The primer layer may be formed by any desired techniques including dipping, bar coating, transfer coating, screen printing, and spray coating. The coated composition may be allowed to stand at room temperature until a primer layer is formed. Alternatively, film formation may be promoted by heating at a temperature of up to 250° C. The primer layer preferably has a thickness of 0.1 to 50 μm, and more preferably 1 to 20 μm.

The seal layer is then formed on the primer layer. Specifically, the liquid addition-curable silicone rubber composition is molded into a seal shape on the primer-coated separator substrate by a suitable molding technique, for example, an insert molding technique involving compression, transfer or injection molding or a screen printing technique. With respect to the curing conditions for the silicone rubber composition, the curing temperature may range from room temperature to elevated temperature. The economically acceptable curing conditions include a temperature of 100 to 220° C. and a time of 10 seconds to 2 hours and preferably 120 to 200° C. and 20 seconds to 30 minutes. The cured rubber (seal layer) may be post-cured in an oven for the purposes of enhancing adhesion, reducing compression set and the like. Preferred post-curing conditions include a temperature of 100 to 220° C. and a time of 30 minutes to 100 hours and more preferably 120 to 200° C. and 1 to 8 hours. The seal layer preferably has a thickness of 50 to 5,000 μm, and more preferably 100 to 1,000 μm.

The compositions of which the primer and seal layers are formed should satisfy the requirement that a molar ratio of the total amount of Si—H functional groups to the total amount of alkenyl groups available per unit weight from the primer composition and the silicone rubber composition be in the range: 5.0<(total amount of Si—H functional groups)/(total amount of alkenyl groups)<50.0. The preferred range is 8.0<(total amount of Si—H functional groups)/(total amount of alkenyl groups)<40.0, and more preferably 10.0<(total amount of Si—H functional groups)/(total amount of alkenyl groups)<30.0. If this molar ratio is less than 5.0, then the adhesion between the primer layer and the substrate or the seal layer may be insufficient. If the molar ratio is more than 50.0, then adhesion in an acidic solution may be aggravated. Notably, the amounts of alkenyl groups and Si—H functional groups in the primer composition are determined based on the active components. The active components in the primer composition are determined as the nonvolatile matter upon heating 105° C.×3 hours. Specifically, the nonvolatile content is determined by weighing a 1.5-2.0 g sample from the primer composition, placing it in an aluminum dish, statically holding it in an oven at 105° C. for 3 hours, and measuring a weight change before and after heating. The amount of alkenyl groups may be measured by Hanus' method based on iodine back titration, and the amount of Si—H functional groups be measured by the method of adding alkali to liberate hydrogen gas.

Now referring to the figures, some embodiments of the separator for PEFCs according to the invention are illustrated. The invention is not limited thereto.

Figure 2:
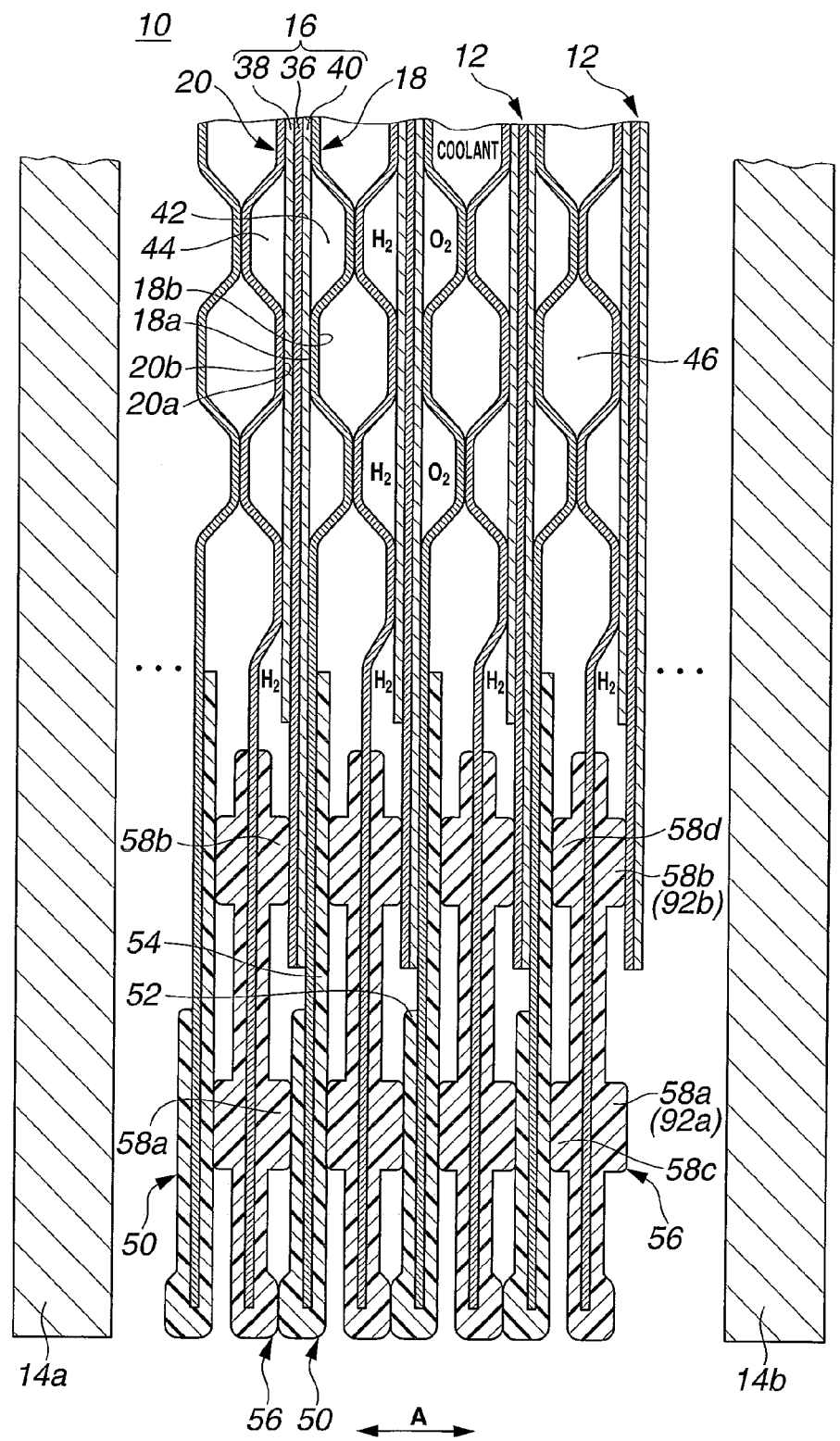
FIG. 2 is a cross-sectional view of the fuel cell stack taken along lines II-II in FIG. 1.

FIG. 1 is a perspective exploded view showing main components of a power-generating cell 12 constituting a fuel cell stack 10 according to one embodiment of the invention. A plurality of power-generating cells 12 are stacked in the direction of arrow A to construct the fuel cell stack 10. FIG. 2 is a cross-sectional view of this fuel cell stack 10 taken along lines II-II in FIG. 1.

Figure 3:
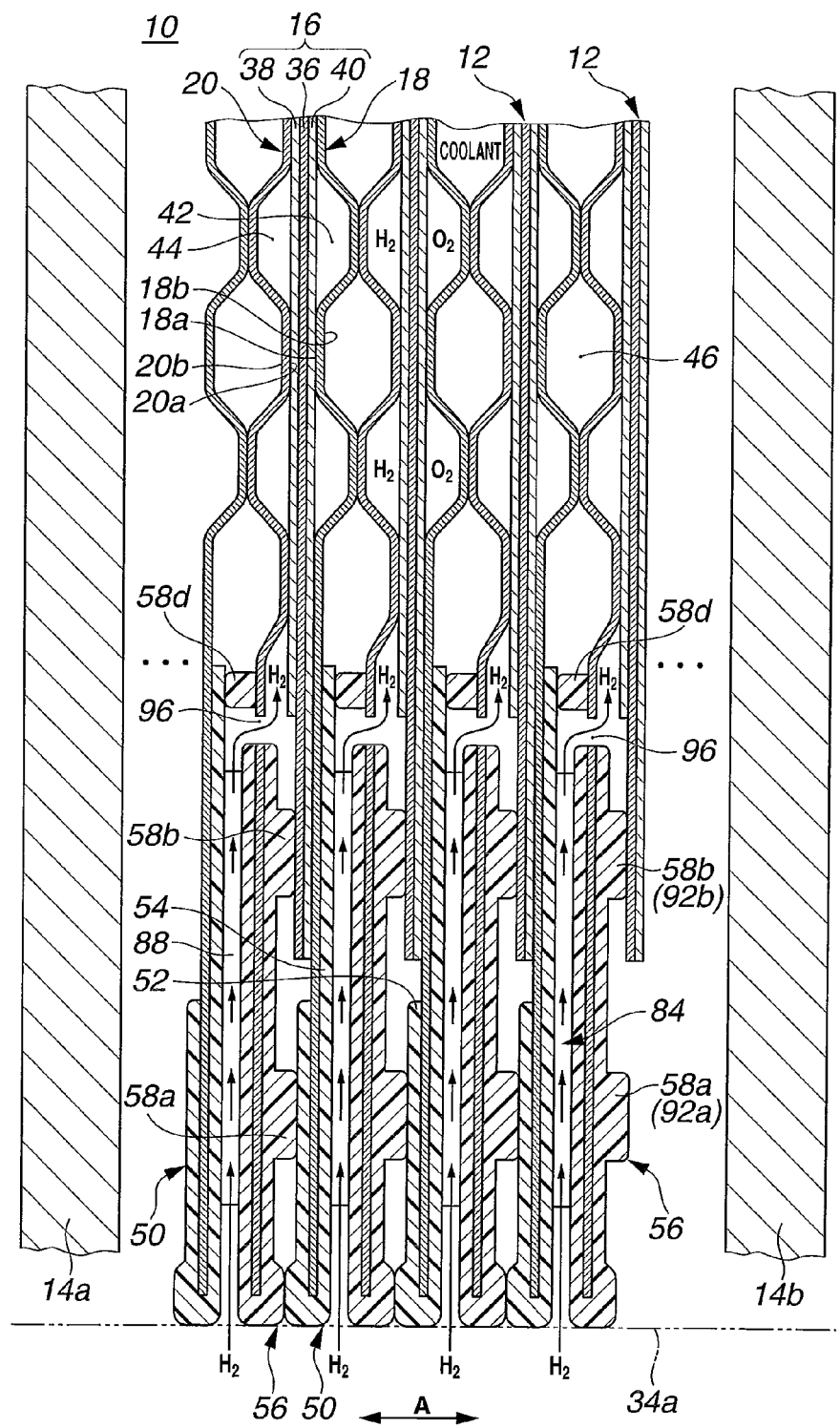
FIG. 3 is a cross-sectional view traversing a fuel gas inlet communication hole of the fuel cell stack.
Figure 4:
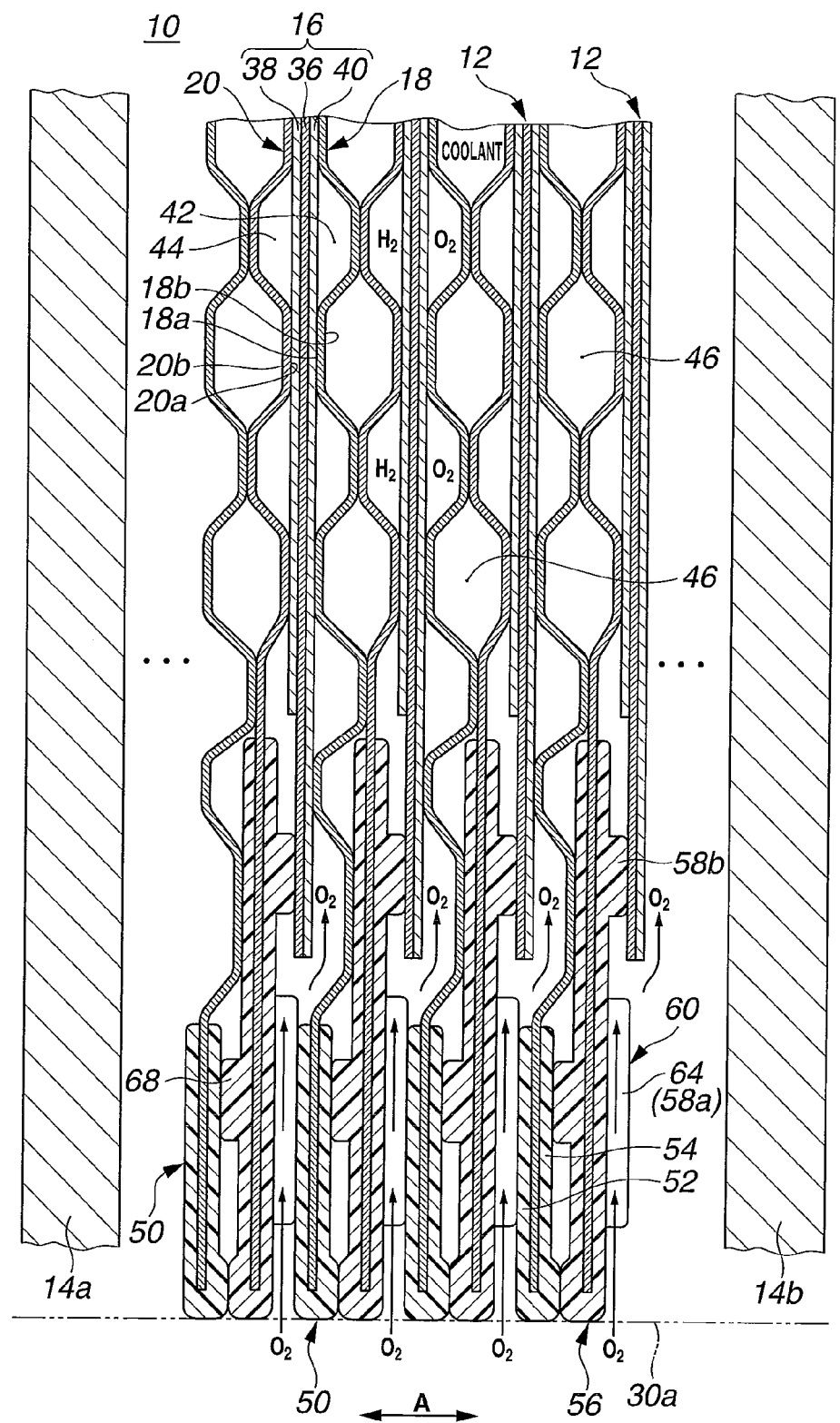
FIG. 4 is a cross-sectional view traversing an oxidant gas inlet communication hole of the fuel cell stack.

As shown in FIGS. 2 to 4, the fuel cell stack 10 includes a plurality of power-generating cells 12 stacked in the direction of arrow A and end plates 14a, 14b at opposite ends in the stacking direction. The end plates 14a, 14b are fixedly tied via tie rods (not shown) so that a fastening load is applied across the stacked cells 12 in the direction of arrow A.

As shown in FIG. 1, each power-generating cell 12 includes an electrolyte membrane-electrode assembly (MEA) 16 interposed between first and second metal separators 18 and 20. The first and second metal separators 18 and 20 are, for example, steel plates, stainless steel plates, aluminum plates, plated steel plates or such metal plates which have been surface treated to be corrosion resistant. Their thickness is set in the range of 0.05 to 1.0 mm, for example.

At one side edge of the power-generating cell 12 in the direction of arrow B (in FIG. 1, typically horizontal direction), an oxidant gas inlet communication hole 30a for feeding an oxidant gas such as oxygen-containing gas, a coolant outlet communication hole 32b for discharging a coolant medium, and a fuel gas outlet communication hole 34b for discharging a fuel gas such as hydrogen-containing gas, which are in fluid communication with corresponding holes in adjacent cells in the direction of arrow A or stacking direction, are arranged in the direction of arrow C (typically vertical direction).

At the other side edge of the power-generating cell 12 in the direction of arrow B, a fuel gas inlet communication hole 34a for feeding the fuel gas, a coolant inlet communication hole 32a for feeding the coolant medium, and an oxidant gas outlet communication hole 30b for discharging the oxidant gas, which are in fluid communication with corresponding holes in adjacent cells in the direction of arrow A, are arranged in the direction of arrow C.

Specifically, the MEA 16 includes a solid polymer electrolyte membrane 36 in the form of a perfluorocarbon sulfonic acid thin film impregnated with water, which is sandwiched between an anode (or first electrode) 38 and a cathode (or second electrode) 40. The anode 38 has a smaller surface area than the cathode 40.

The anode 38 and cathode 40 each include a gas diffusion layer formed of carbon paper or the like, and an electrocatalytic layer which is formed by uniformly applying porous carbon particles having a platinum alloy supported on their surfaces to the surface of the gas diffusion layer. The electrocatalytic layers are joined to the opposite surfaces of the solid polymer electrolyte membrane 36.

Figure 5:
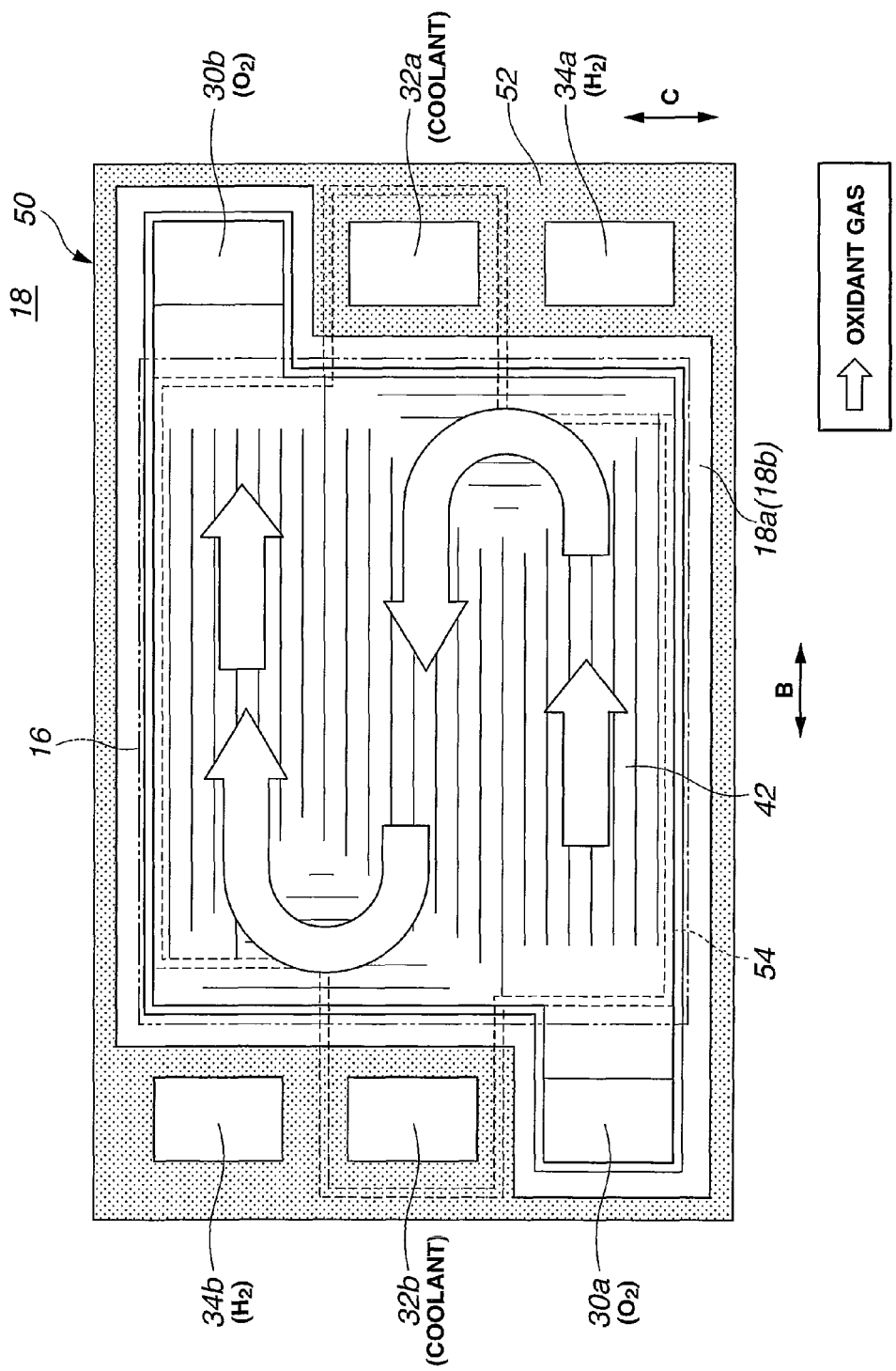
FIG. 5 is a front view of a first metal separator constituting the power-generating cell.
Figure 6:
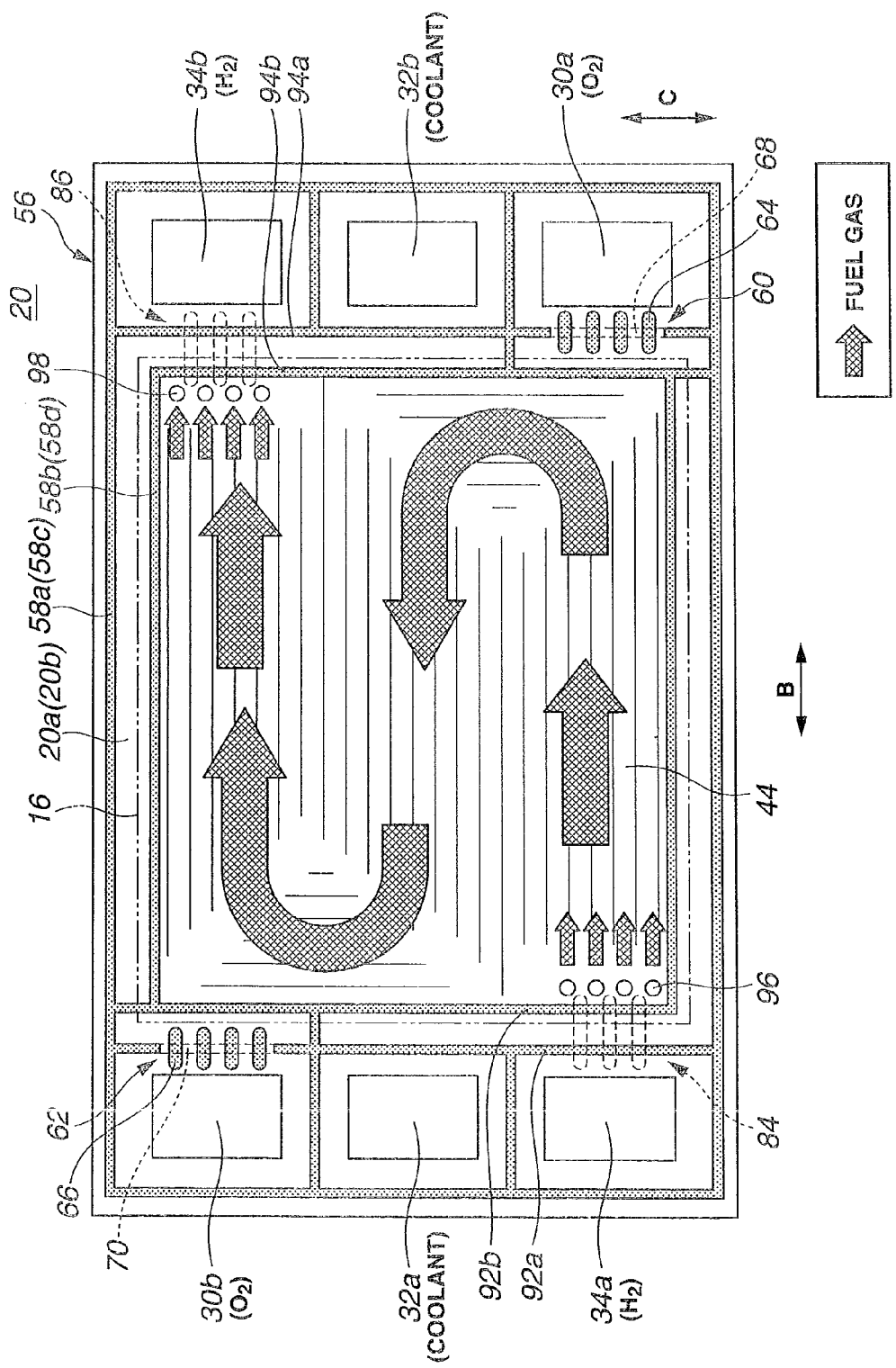
FIG. 6 is a front view showing one surface of a second metal separator constituting the power-generating cell.

The first and second metal separators 18 and 20 have inner surfaces 18a and 20a facing MEA 16 and outer surfaces 18b and 20b, respectively. The inner surface 18a of first metal separator 18 is provided with oxidant gas flow channels (reaction gas flow channels) 42 which extend in a serpentine manner in the direction of arrow B and vertically upward (see FIGS. 1 and 5). As shown in FIG. 6, the inner surface 20a of second metal separator 20 is provided with fuel gas flow channels (reaction gas flow channels) 44 which are in fluid communication with fuel gas inlet communication hole 34a and fuel gas outlet communication hole 34b as will be described later, and extend in a serpentine manner in the direction of arrow B and vertically upward (in the direction of arrow C).

As shown in FIGS. 1 and 2, coolant flow channels 46 are defined between the surfaces 18b and 20b of first and second metal separators 18 and 20 and in fluid communication with coolant inlet and outlet communication holes 32a and 32b. The coolant flow channels 46 extend straight in the direction of arrow B.

As shown in FIGS. 1 to 5, a first seal member 50 extends circumferentially along the peripheral edge of first metal separator 18 and is integrally joined to the surfaces 18a and 18b of first metal separator 18. The first seal member 50 is formed by applying the rubber composition to the separator substrate by a technique such as compression molding, casting, injection molding, transfer molding, dipping, coating or screen printing, and curing.

The first seal member 50 includes a first planar portion 52 which is integrally joined to the surface 18a of first metal separator 18 and a second planar portion 54 which is integrally joined to the surface 18b of first metal separator 18. The second planar portion 54 extends longer than the first planar portion 52.

As shown in FIGS. 2 and 3, the first planar portion 52 extends circumferentially at a position outward spaced apart from the peripheral edge of MEA 16, and the second planar portion 54 extends circumferentially over a region overlying a certain portion of cathode 40. As shown in FIG. 5, the first planar portion 52 is formed such that oxidant gas inlet and outlet communication holes 30a and 30b are in fluid communication with oxidant gas flow channels 42, and the second planar portion 54 is formed such that coolant inlet communication hole 32a is in fluid communication with coolant outlet communication hole 32b.

A second seal member 56 extends circumferentially along the peripheral edge of second metal separator 20 and is integrally joined to the surfaces 20a and 20b of second metal separator 20. On the surface 20a side of second metal separator 20, the second seal member 56 is provided with an outside seal 58a which is disposed on surface 20a in proximity to the peripheral edge of second metal separator 20, and an inside seal 58b which is inwardly spaced apart from the outside seal 58a. The outside and inside seals 58a and 58b are provided on one side of second seal member 56 facing the anode 38.

The outside and inside seals 58a and 58b may have any desired shape selected from a tapered (or lip), trapezoid and semicylindrical shape. The outside seal 58a is in contact with first planar portion 52 of first metal separator 18, and the inside seal 58b is in direct contact with solid polymer electrolyte membrane 36 of MEA 16.

As shown in FIG. 6, the outside seal 58a circumscribes oxidant gas inlet communication hole 30a, coolant outlet communication hole 32b, fuel gas outlet communication hole 34b, fuel gas inlet communication hole 34a, coolant inlet communication hole 32a and oxidant gas outlet communication hole 30b. The inside seal 58b circumscribes fuel gas flow channels 44. The peripheral edge of MEA 16 is disposed between outside and inside seals 58a and 58b.

Figure 7:
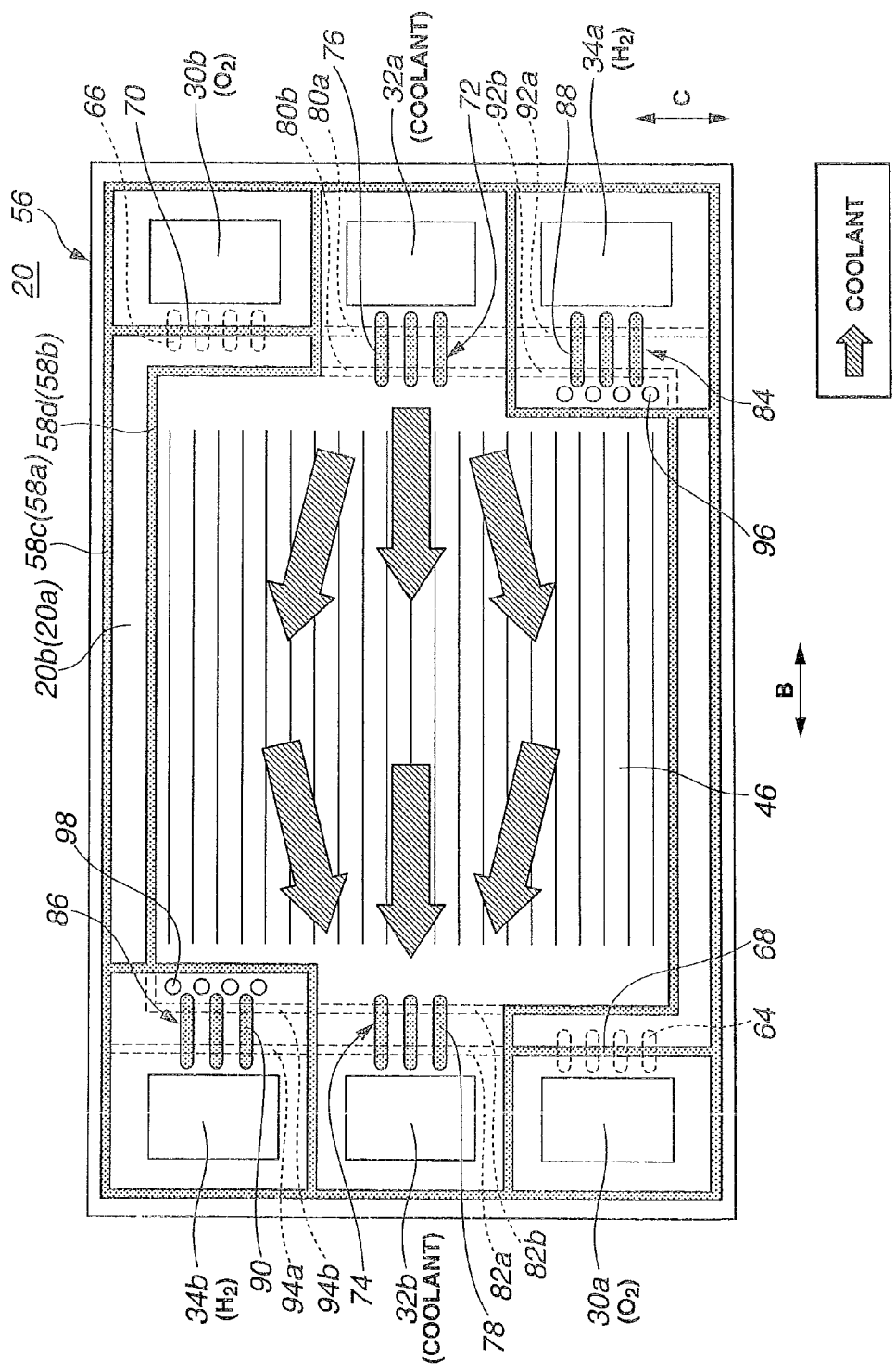
FIG. 7 is a front view showing the other surface of the second metal separator constituting the power-generating cell.

On the surface 20b side of second metal separator 20, the second seal member 56 is provided with an outside seal (coolant seal) 58c which corresponds to outside seal 58a, and an inside seal 58d which corresponds to inside seal 58b (see FIG. 7). The outside and inside seals 58c and 58d have the same shape as outside and inside seals 58a and 58b.

As shown in FIG. 6, the outside seal 58a is provided with an inlet manifold 60 which establishes fluid communication between oxidant gas inlet communication hole 30a and oxidant gas flow channels 42, and an outlet manifold 62 which establishes fluid communication between oxidant gas outlet communication hole 30b and oxidant gas flow channels 42.

The inlet manifold 60 is constructed by a plurality of supports 64 which are formed by cutting off outside seal 58a at positions spaced apart in the direction of arrow C and extend in the direction of arrow B. Communication paths for oxidant gas are defined between supports 64. The outlet manifold 62 is similarly constructed by a plurality of supports 66 which are formed by partially cutting off outside seal 58a and extend in the direction of arrow B. The supports 66 are in contact with first planar portion 52 to define communication paths for oxidant gas therebetween.

The supports 64 of inlet manifold 60 overlie seal laps 68 of outside seal 58c while being on the opposite surfaces 20a, 20b of second metal separator 20. Notably, the seal laps 68 are portions of outside seal 58c that overlie supports 64 of outside seal 58a, with second metal separator 20 interposed therebetween.

The outlet manifold 62 is constructed as is the inlet manifold 60. The supports 64 and seal laps 70 of outside seal 58c that overlie each other on the opposite surfaces 20a, 20b of second metal separator 20 are set such that the deformation of seals in the stacking direction under the load applied in the stacking direction is substantially equalized (see FIG. 6).

As shown in FIG. 7, the surface 20b of second metal separator 20 is provided with an inlet manifold 72 which establishes fluid communication between coolant inlet communication hole 32a and coolant flow channels 46, and an outlet manifold 74 which establishes fluid communication between coolant outlet communication hole 32b and coolant flow channels 46. The inlet manifold 72 is constructed by a plurality of supports 76 which are spaced apart in the direction of arrow C, extend in the direction of arrow B, and constitute outside and inside seals 58c and 58d. The outlet manifold 74 is similarly constructed by a plurality of supports 78 which are spaced apart in the direction of arrow C, extend in the direction of arrow B, and constitute outside and inside seals 58c and 58d.

The inlet manifold 72 overlies seal laps 80a and 80b constituting outside and inside seals 58a and 58b on surface 20a, with second metal separator 20 interposed therebetween.

Similarly, supports 78 constituting outlet manifold 74 overlie seal laps 82a and 82b of outside and inside seals 58a and 58b, while being on opposite surfaces 20a and 20b of second metal separator 20, as shown in FIG. 7.

As shown in FIG. 7, on the surface 20b of second metal separator 20, an inlet manifold 84 and an outlet manifold 86 are provided in proximity to fuel gas inlet communication hole 34a and fuel gas outlet communication hole 34b, respectively. The inlet manifold 84 is provided with a plurality of supports 88 arranged in the direction of arrow C, and the outlet manifold 86 is similarly provided with a plurality of supports 90 arranged in the direction of arrow C.

The supports 88 of inlet manifold 84 overlie seal laps 92a and 92b of outside and inside seals 58a and 58b, with second metal separator 20 interposed therebetween. Similarly, the supports 90 of outlet manifold 86 overlie seal laps 94a and 94b of outside and inside seals 58a and 58b, with second metal separator 20 interposed therebetween.

The inlet manifold 84 and seal laps 92a, 92b, and the outlet manifold 86 and seal laps 94a, 94b are set such that the deformation of seals in the stacking direction under the load applied in the stacking direction is substantially equalized. Specifically, the inlet manifold 84 is constructed as is the inlet manifold 72. A plurality of feed holes 96 and discharge holes 98 are formed in proximity to inlet and outlet manifolds 84 and 86 and disposed outward of inside seal 58d. The feed holes 96 and discharge holes 98 are formed throughout the separator inward of inside seal 58b on the surface 20a side of second metal separator 20 and at the inlet and outlet sides of fuel gas flow channels 44 (see FIG. 6).

Although outside seal 58c is formed as a coolant seal on the surface 20b of second metal separator 20 in the illustrated embodiment, the invention is not limited thereto. Such a coolant seal may be formed on the surface 18b of first metal separator 18.

EXAMPLE

Examples and Comparative Examples are given below for further illustrating the invention, but the invention is not limited thereto. All parts are by weight.

Primer Composition #1

Primer composition #1 was prepared by dissolving 100 parts of component (1)-1, 30 parts of component (1)-2, 5 parts of component (1)-3, and 100 parts of component (1)-4, shown below, in 500 parts of methyl ethyl ketone. This primer composition had a Si—H functional group content of 0.0032 mol/g and an alkenyl group content of 0.000096 mol/g of the active components.

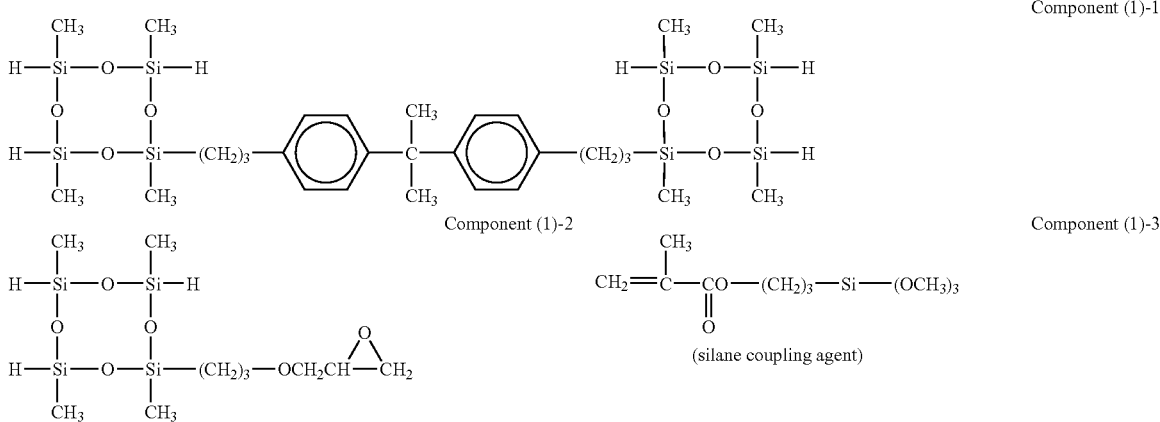

Component (1)-1, Component (1)-2, Component (1)-3 (silane coupling agent)

Component (1)-4 (Silicone Resin)

A copolymer consisting of $C_6H_5SiO_{3/2}$ units, $CH_3SiO_{3/2}$ units, and $(CH_3)_2SiO_{2/2}$ units, wherein a phenyl proportion is 40 mol % based on the total of phenyl and methyl groups, an OH group content is 2.5 wt %, and a molar ratio of $C_6H_5SiO_{3/2}$ plus $CH_3SiO_{3/2}$ units to the overall siloxane units is 40 mol %, the copolymer having a weight average molecular weight of 3,600.

Primer Composition #2

Primer composition #2 was prepared by dissolving 100 parts of component (2)-1, 50 parts of component (2)-2, 5 parts of component (2)-3, 200 parts of component (2)-4, shown below, and 0.5 part of tetrabutyl titanate in 1,000 parts of toluene. This primer composition had a Si—H functional group content of 0.0022 mol/g and an alkenyl group content of 0.00016 mol/g of the active components.

Primer Composition #3

Primer composition #3 was prepared by dissolving 50 parts of component (1)-1, 30 parts of component (1)-2, 50 parts of component (1)-3, and 200 parts of component (1)-4 in 500 parts of methyl ethyl ketone. This primer composition had a Si—H functional group content of 0.0018 mol/g and an alkenyl group content of 0.000070 mol/g of the active components.

Silicone Rubber Composition #1

80 parts of a dimethylvinylsiloxy-terminated dimethylpolysiloxane having a weight average degree of polymerization of 300 was mixed with 22 parts of fumed silica having a specific surface area of 300 m²/g (Aerosil 300, Nippon Aerosil Co., Ltd.), 5 parts of hexamethyldisilazane, 0.2 part of divinyltetramethyldisilazane, and 2.0 parts of water at room temperature for 30 minutes. The mixture was heated at 150°

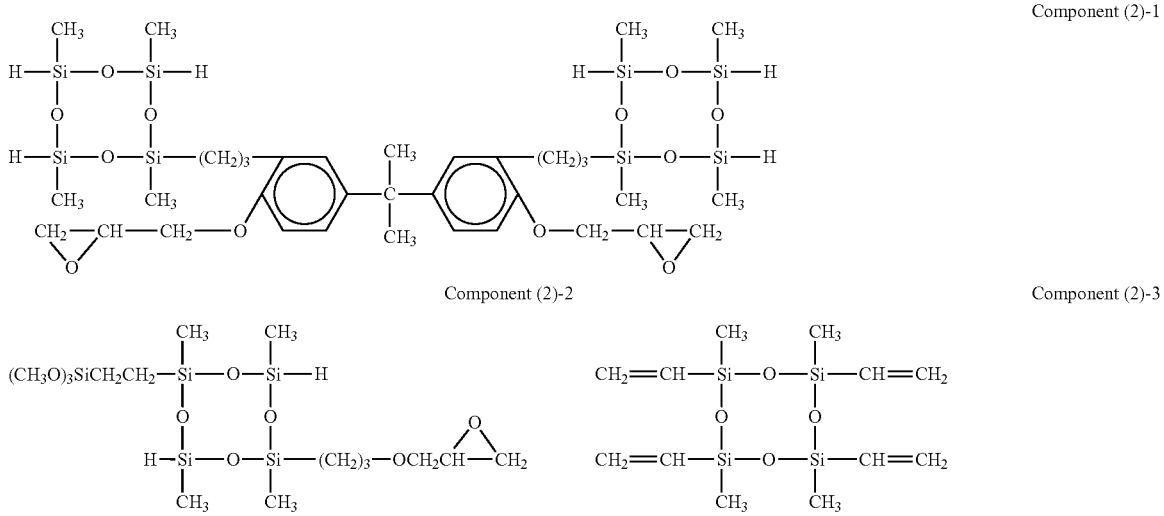

Component (2)-1, Component (2)-2, Component (2)-3

Component (2)-4 (Silicone Resin)

A copolymer consisting of $C_6H_5SiO_{3/2}$ units, $CH_3SiO_{3/2}$ units, and $(CH_3)_2SiO_{2/2}$ units, wherein a phenyl proportion is 51 mol % based on the total of phenyl and methyl groups, an OH group content is 0.9 wt %, and a molar ratio of $C_6H_5SiO_{3/2}$ plus $CH_3SiO_{3/2}$ units to the overall siloxane units is 45 mol %, the copolymer having a weight average molecular weight of 8,100.

C., agitated at the temperature for 3 hours, and cooled. The mixture was further combined with 20 parts of a trimethylsiloxy-terminated dimethylpolysiloxane containing vinyl on side chains (an average degree of polymerization=150, a vinyl content=0.00041 mol/g) and milled once on a three-roll mill, yielding a silicone rubber base. To 122 parts of the silicone rubber base were added 3.7 parts (giving [Si—H/alkenyl]=1.8) of a methylhydrogenpolysiloxane containing Si—H groups at both ends and on side chains (a degree of polymerization=32, a Si—H content=0.0066 mol/g) as a crosslinker and 0.05 part of ethynyl cyclohexanol as a reaction regulator. The mixture was agitated for 15 minutes and further mixed with 0.1 part of a platinum catalyst (Pt concentration 1 wt %), yielding Silicone rubber composition #1.

Silicone Rubber Composition #2

70 parts of a dimethylvinylsiloxy-terminated dimethylpolysiloxane having vinyl on side chains (a vinyl content=0.00011 mol/g, a weight average degree of polymerization=520) and 12 parts of a resinous copolymer consisting of $(CH_3)_3SiO_{1/2}$ units, $CH_2=CH(CH_3)_2SiO_{1/2}$ units, $SiO_2$ units, and $(CH_3)_2SiO$ units $([(CH_3)_3SiO_{1/2}+CH_2=CH(CH_3)_2SiO_{1/2}$ units]/$(SiO_2$ units)=0.79, a $(CH_3)_2SiO$ unit content=15 wt %, a vinyl content=0.00022 mol/g, a weight average molecular weight=6,200) and having a three-dimensional network structure were mixed with 25 parts of fumed silica having a specific surface area of 200 $m^2/g$ (Aerosil 200, Nippon Aerosil Co., Ltd.), 5 parts of hexamethyldisilazane, and 2.0 parts of water at room temperature for 30 minutes. The mixture was heated at 150° C., agitated at the temperature for 3 hours, and cooled. The mixture was further combined with 20 parts of a dimethylvinylsiloxy-terminated dimethylpolysiloxane having an average degree of polymerization of 200 and milled once on a three-roll mill, yielding a silicone rubber base. To 127 parts of the silicone rubber base were added 3.5 parts (giving [Si—H/alkenyl]=1.2) of a methylhydrogenpolysiloxane containing Si—H groups solely on side chains (a degree of polymerization=20, a Si—H content=0.0044 mol/g) as a crosslinker and 0.05 part of ethynyl cyclohexanol as a reaction regulator. The mixture was agitated for 15 minutes and further mixed with 0.1 part of a platinum catalyst (Pt concentration 1 wt %), yielding Silicone rubber composition #2.

Bond Test 1

The substrates used were metal substrates (SUS316) and resin substrates (polyphenylene sulfide PPS) dimensioned 25 mm×50 mm×0.15 mm (thick). Each substrate was cleaned on its surface with acetone, dried, and brush coated with Primer composition #1 so as to eventually give a film (consisting of active components) of 5 μm thick. The primer coating was kept at room temperature (25° C.) for 30 minutes and then baked in an oven at 160° C. for one hour. After cooling, Silicone rubber composition #1 was press molded on a selected region of the primer-coated substrate at 150° C. for 3 minutes, yielding a molded article in which the rubber layer was integrated to the substrate, the rubber layer being dimensioned 25 mm×10 mm×0.5 mm (thick). At this point, the integrally molded article was examined by a peeling test of peeling the rubber layer therefrom. For both the metal and resin substrates, the test results were 100% rubber cohesive failure. The integrally molded article was post-cured in an oven at 200° C. for 2 hours, and immersed in sulfuric acid aqueous solution (pH 2) at 95° C. for 100 hours. The article was taken out, washed with water, and examined again by the peeling test. For both the metal and resin substrates, the test results were 100% rubber cohesive failure.

Primer composition #1 and Silicone rubber composition #1, when combined, had a total amount of Si—H functional groups of 0.00349 mol/g and a total amount of alkenyl groups of 0.00024 mol/g, which corresponded to a [Si—H/alkenyl] ratio of 14.1.

Bond Test 2

The substrates used were metal substrates (SUS316) and resin substrates (PPS) dimensioned 25 mm×50 mm×0.15 mm (thick). Each substrate was cleaned on its surface with acetone, dried, and brush coated with Primer composition #2 so as to eventually give a film (consisting of active components) of 5 μm thick. The primer coating was kept at room temperature (25° C.) for 30 minutes and then baked in an oven at 160° C. for one hour. After cooling, Silicone rubber composition #2 was press molded on a selected region of the primer-coated substrate at 150° C. for 3 minutes, yielding a molded article in which the rubber layer was integrated to the substrate, the rubber layer being dimensioned 25 mm×10 mm×0.5 mm (thick). At this point, the integrally molded article was examined by the peeling test. For both the metal and resin substrates, the test results were 100% rubber cohesive failure. The integrally molded article was post-cured in an oven at 200° C. for 2 hours, and immersed in sulfuric acid aqueous solution (pH 2) at 95° C. for 100 hours. The article was taken out, washed with water, and examined again by the peeling test. For both the metal and resin substrates, the test results were 100% rubber cohesive failure.

Primer composition #2 and Silicone rubber composition #2, when combined, had a total amount of Si—H functional groups of 0.00232 mol/g and a total amount of alkenyl groups of 0.00026 mol/g, which corresponded to a [Si—H/alkenyl] ratio of 8.8.

Bond Test 3

The substrates used were metal substrates (SUS316) and resin substrates (PPS) dimensioned 25 mm×50 mm×0.15 mm (thick). Each substrate was cleaned on its surface with acetone, dried, and brush coated with Primer composition #3 so as to eventually give a film (consisting of active components) of 5 μm thick. The primer coating was kept at room temperature (25° C.) for 30 minutes and then baked in an oven at 160° C. for one hour. After cooling, Silicone rubber composition #1 was press molded on a selected region of the primer-coated substrate at 150° C. for 3 minutes, yielding a molded article in which the rubber layer was integrated to the substrate, the rubber layer being dimensioned 25 mm×10 mm×0.5 mm (thick). At this point, the integrally molded article was examined by the peeling test. The test result for the metal substrate was 100% rubber cohesive failure, and the test result for the resin substrate was 20-30% rubber cohesive failure. The integrally molded article was post-cured in an oven at 200° C. for 2 hours, and immersed in sulfuric acid aqueous solution (pH 2) at 95° C. for 100 hours. The article was taken out, washed with water, and examined again by the peeling test. For both the metal and resin substrates, easy overall peeling was ascertained.

Primer composition #3 and Silicone rubber composition #1, when combined, had a total amount of Si—H functional groups of 0.00202 mol/g and a total amount of alkenyl groups of 0.00084 mol/g, which corresponded to a [Si—H/alkenyl] ratio of 2.4.

Japanese Patent Application No. 2008-047601 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A sealing material for use in a fuel cell separator comprising:
   a separator substrate,
   a primer layer thereon, and
   an elastomeric sealing material on the primer layer, said sealing material comprising:
      a primer composition containing Si—H functional groups of which the primer layer is formed, and a liquid addition-curable silicone rubber composition containing alkenyl groups and Si—H functional groups of which the elastomeric sealing material is formed, wherein a molar ratio of a total amount of the Si—H functional groups to a total amount of the alkenyl groups per unit weight of the primer composition and the liquid addition-curable silicone rubber composition is in the range: 5.0<(total amount of the Si—H functional groups)/(total amount of the alkenyl groups)<50.0, wherein said liquid addition-curable silicone rubber composition comprises:

(A) 100 parts by weight of a liquid organopolysiloxane containing at least two of the alkenyl groups each attached to a silicon atom in a molecule, (B) 0.5 to 20 parts by weight of an organohydrogenpolysiloxane containing at least three of the Si—H functional groups in a molecule, (C) 5 to 30 parts by weight of fumed silica having a specific surface area of 50 to 400 m²/g, and (D) an addition reaction catalyst from a platinum group metal, a molar ratio of the Si—H functional groups in component (B) to the alkenyl groups in component (A) being in the range: 0.8≤the Si—H functional groups/the alkenyl groups≤3.0.

2. The sealing material of claim 1, wherein said fumed silica has a specific surface area of 100 to 350 m²/g.

3. The sealing material of claim 1, wherein said primer composition comprises:

(E) an organosilicon compound containing at least one epoxy group, at least one of the Si—H functional groups, and at least one aromatic ring in a molecule, (F) a silicone resin, and (G) a compound containing at least two of the alkenyl groups in a molecule.

4. A combination of the silicone rubber composition with the primer composition set forth in claim 1 for use in fuel cell separators, wherein the amount of the Si—H functional groups in the primer composition is in the range of 0.1 to 10.0 mmol per gram of the active components exclusive of solvent given as the nonvolatile content after heating at 105° C. for 3 hours.

5. The sealing material of claim 1, wherein an amount of the addition reaction catalyst from the platinum group metal is 1 to 500 ppm based on a weight of component (A).

* * * * *